United States Patent [19]

Proffitt

[11] Patent Number: 4,988,243
[45] Date of Patent: Jan. 29, 1991

[54] SPRING-LOADED CENTER

[76] Inventor: Jimmie L. Proffitt, 11905 W. Kingsgate Rd., Concord, Tenn. 37922

[21] Appl. No.: 313,584

[22] Filed: Feb. 21, 1989

[51] Int. Cl.⁵ ............................................. B23G 3/00
[52] U.S. Cl. .............................. 408/241 R; 10/129 M; 142/53; 82/150
[58] Field of Search ............... 408/241 R, 75, 87, 120, 408/123; 82/150, 151; 10/129 M, 129 P, 135 R; 51/238 R; 142/53; 33/644, 645, 629, 632, 630; 81/451

[56] References Cited

U.S. PATENT DOCUMENTS

| | | | |
|---|---|---|---|
| 1,260,264 | 3/1918 | Huszar | 144/23 X |
| 1,522,102 | 1/1925 | Cibelli | 408/186 |
| 1,704,852 | 3/1929 | Bath | 142/53 X |
| 1,922,614 | 8/1933 | Bradshaw | 264/124 |
| 2,286,088 | 6/1942 | Harrell | 10/135 |
| 2,376,905 | 5/1945 | Davenport | 82/150 |
| 2,426,566 | 8/1947 | Reinsch | 82/150 |
| 2,484,801 | 10/1949 | Anderson | 33/169 |
| 2,520,473 | 8/1950 | Shepard | 82/150 |
| 2,564,256 | 8/1951 | Henderhan | 82/33 |
| 2,788,683 | 4/1957 | Evans | 408/75 X |
| 2,923,180 | 2/1960 | Dunn et al. | 408/68 |
| 3,011,185 | 12/1961 | Khachigian | 10/129 R |
| 3,265,343 | 8/1966 | Sanford, Jr. | 408/241 X |
| 3,456,534 | 7/1969 | Williams | 82/33 |
| 3,519,096 | 7/1970 | Lunzer | 82/150 X |
| 3,610,077 | 10/1971 | Stapelmann | 82/150 X |
| 3,653,780 | 4/1972 | Ammatuna | 408/241 |
| 4,370,907 | 2/1983 | Felice | 82/150 |
| 4,687,384 | 8/1987 | McCoy | 408/16 |

Primary Examiner—Z. R. Bilinsky
Assistant Examiner—Robert Schultz
Attorney, Agent, or Firm—Luedeka, Hodges & Neely

[57] ABSTRACT

A center for maintaining a cutting tool, such as a tapping tool or reamer, in axial alignment with a hole to be worked upon includes an elongated body and a centering pin received by a cavity defined in the body for movement between retracted and extended positions. A spring is interposed between the body and the centering pin for biasing the pin from the retracted position to the extended position, and the pin includes an accessible handle which projects through a slot provided in the body. The handle can be manipulated into a position within the slot for releasably locking the centering pin in a retracted position. For mounting the center within a machine tool, the body includes an end portion including a plurality of alternatively-sized cylindrical sections arranged axially along the body so that the body can be mounted within collets of alternative sizes. Moreover, the centering pin includes a live end for engaging the cutting tool when rotating to thereby reduce wear on the pin.

7 Claims, 1 Drawing Sheet

FIG.1

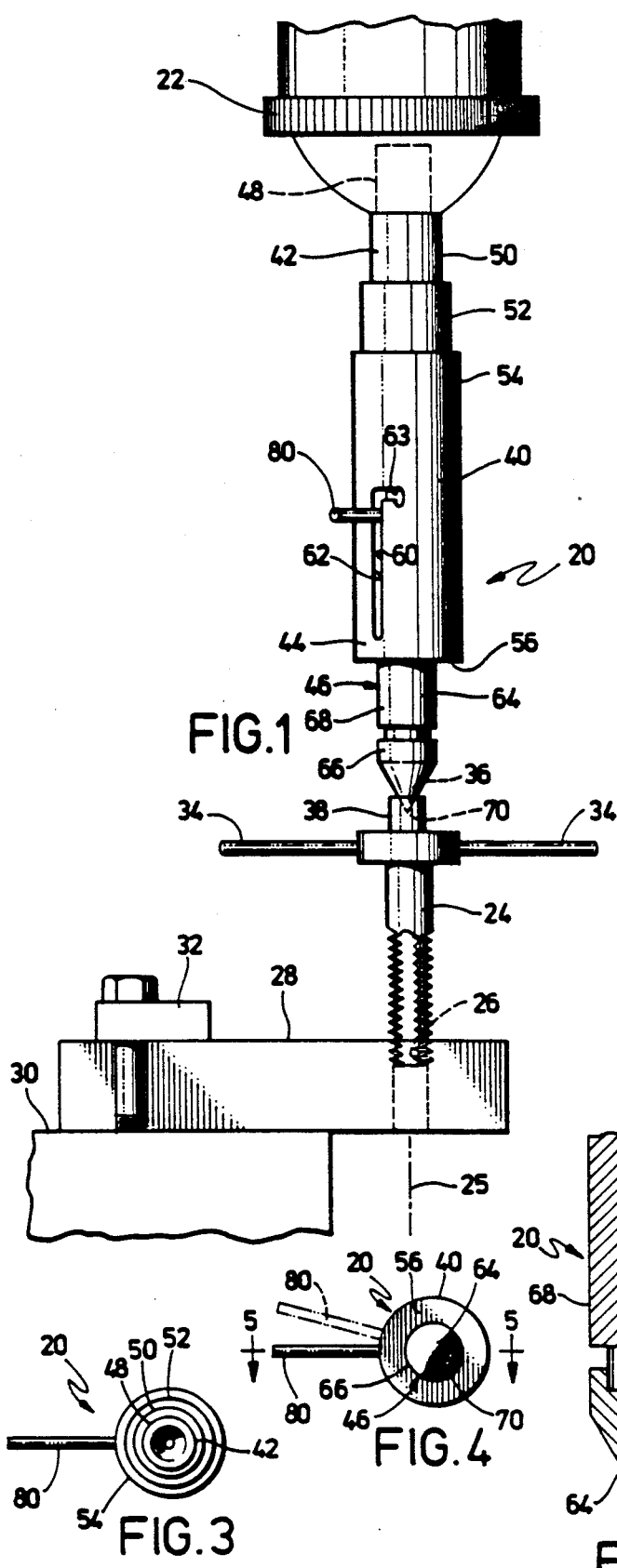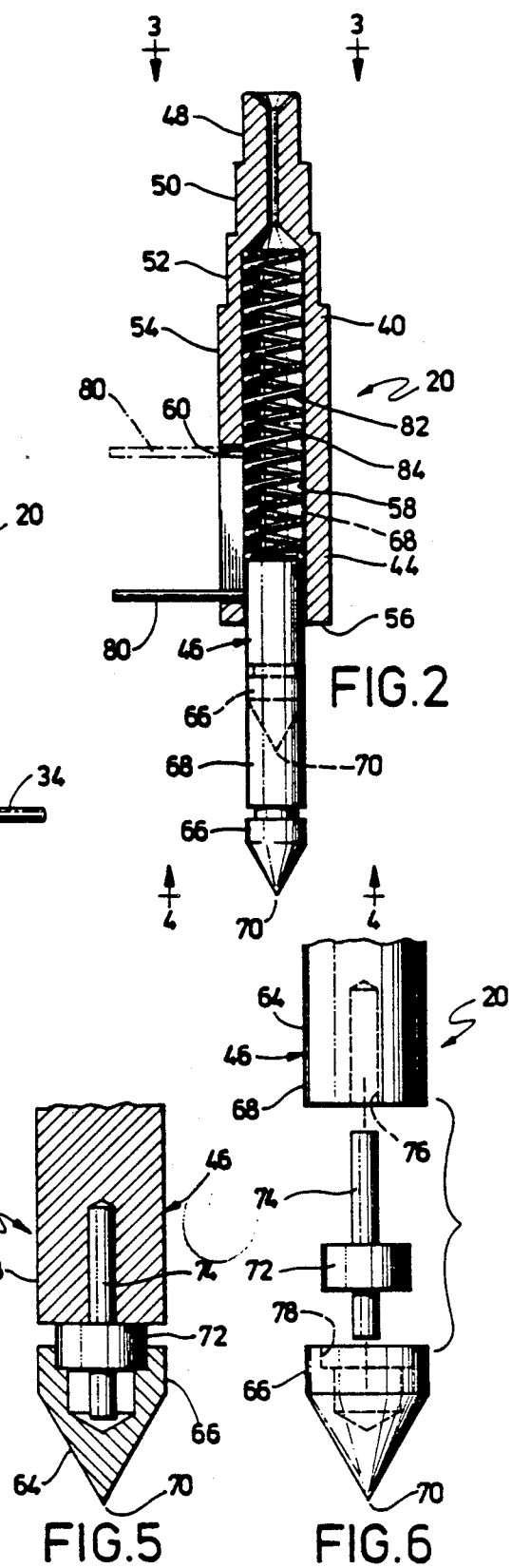

SPRING-LOADED CENTER

BACKGROUND OF THE INVENTION

This invention relates generally to centers for use in the machining art and relates more particularly to spring-loaded centers for maintaining a rotatable cutting tool, such a tapping tool or reamer, in axial alignment with a hole to be worked upon.

A spring-loaded center with which this invention is concerned includes an elongated body having a shank adapted to be mounted within the holder of a machine tool, such as the spindle of a drill, and defining a cavity opening out of the body opposite the shank end. A tipped centering pin is slidably mounted within the body cavity for movement between an extended position and a retracted position. A spring is interposed between the body and the centering pin for biasing the pin from the retracted position toward the extended position. Examples of centers of the aforedescribed type are described in U.S. Pat. Nos. 2,286,088; 3,653,780; 3,456,534 and 3,653,780.

To use the center, a rotatable cutting tool such as a tapping tool or reamer, is positioned in operative working relationship with a hole formed in a workpiece, and a machine tool holder is positioned in axial registry with the cutting tool. The center is then mounted within the machine tool holder, and the centering pin is operatively maneuvered into engagement with a recess or the like normally provided within an end of the cutting tool. The spring thereafter maintains the centering pin in constant engagement with the cutting tool as the tool moves axially through the hole. With the centering pin in constant engagement with the cutting tool, the holder of the machine tool is not required to be continually moved toward the workpiece as the tool moves axially along through the hole.

One limitation associated with prior art centers, such as those described in the referenced patents, relates to the fact that the centers include no means for holding the centering pins in a retracted condition. Therefore, it is not uncommon that while the center is manipulated into place with the cutting tool, one of the operator's hands is necessary for holding the pin in a retracted position. It would be desirable to provide a new and improved center wherein the centering pin can be locked in a retracted position so that the operator's hand which would ordinarily be required to hold the pin in a retracted position is free to perform other tasks.

It is an object of the present invention to provide a new and improved spring-loaded center of the aforedescribed type.

Another object of the present invention is to provide such a center having a centering pin which can be releasably secured in a retracted position.

Still another object of the present invention is to provide such a center which is capable of being mounted within machine tool collets or similar holders of alternative sizes.

Yet another object of the present invention is to provide such a center which is designed to reduce the likelihood of wear upon its centering pin as the cutting tool is rotated relative to the machine tool holder within which the center is mounted.

SUMMARY OF THE INVENTION

This invention resides in a center for maintaining a cutting tool, such as a tapping tool or reamer, in axial alignment with a workpiece hole to be worked upon.

The center includes an elongated body having two opposite ends wherein one of the ends is adapted to be mounted within the holding device of a machine tool positioned in registry with a hole to be worked upon. An elongated cavity is defined in the body so as to open out of the body end opposite the mounting end. In addition, the body includes a slot which communicates with the cavity and which extends along a side of the body. The center also includes an elongated centering pin having a tipped shank which is positioned within the cavity so that the tip of the shank is directed generally out of the cavity for cooperatively engaging the cutting tool with which the center is to be used. The shank is positioned within the cavity for sliding movement longitudinally of the body between an extended position at which a substantial portion of the pin extends out of the cavity and a retracted position. The centering pin also includes a handle joined to the centering pin shank and extending through the slot. The handle cooperates with the slot so that as the centering pin is guided along the cavity, the handle is guided along the slot. The center also includes biasing means interposed between the centering pin and the elongated body for biasing the centering pin shank from the retracted position toward the extended position.

In one aspect of the invention, the slot is shaped so that the handle can be manipulated into a position therein at which the centering pin shank is releasably locked in a retracted position.

In another aspect of the invention, the end of the body adapted to be mounted within the holding device of a machine tool includes means enabling the center to be mounted within collets of alternative sizes.

In a further aspect of the invention, the centering pin includes an end section providing the tip of the pin and a second section to which the handle is attached. The handle and the slot cooperate to limit the rotation of the second section, and the end section is journaled to the second section so that when the tip cooperatively engages a cutting tool and the cutting tool is rotated, the end section is permitted to rotate with the cutting tool about the longitudinal axis of the shank.

BRIEF DESCRIPTION OF THE DRAWINGS

FIG. 1 is an elevational view, shown partially in section, of a center when mounted within a machine tool for use during a bore-tapping operation;

FIG. 2 is a vertical cross-sectional view of the FIG. 1 illustrating the centering pin when positioned in an extended position;

FIG. 3 is a plan view of the FIG. 1 center as seen from above in FIG. 2;

FIG. 4 is a plan view of the FIG. 1 center as seen from below in FIG. 2;

FIG. 5 is a fragmentary cross-sectional view taken about on line 5—5 of FIG. 4; and FIG. 6 is an elevational view of the fragment of the FIG. 1 center illustrated in FIG. 5, shown exploded.

DETAILED DESCRIPTION OF THE ILLUSTRATED EMBODIMENT

Turning now to the drawings in greater detail, there is shown in FIG. 1 a center 20 operatively interposed between a machine tool-mounted collet 22 and a tapping tool 24 for tapping a bore 26 formed in a metal workpiece 28. The workpiece 28 is fixedly secured in a stationary relationship upon the surface of a table 30 by means of a clamp 32, and the collet 22 is positioned above the workpiece 28 and in operative registry with, or in axial alignment with, the longitudinal axis 25 of the bore 26. The tapping tool 24 is conventional in construction and includes an elongated shank having cutting edges for cutting threads within the surface of the bore 26 as the tapping tool 24 is rotated about its longitudinal axis 25 and simultaneously moved axially through the bore 26. Handles 34 are fixedly secured to the tapping tool 24 adjacent the upper end thereof to facilitate manual rotation of the tool 24. It follows that as the tapping tool 24 is moved axially through the bore 26 during a tapping operation, the tool 24 moves toward and away from the surface of the table 30.

Characteristically, the tapping tool 24 defines an indentation or recess 36 in the tool end 38 opposite its cutting end which is either circular or square in shape. As will be apparent herein, the center 20 cooperates with the tool recess 36 for maintaining the tool 24 in axial alignment with the longitudinal axis 25 of the workpiece bore 26.

With reference still to FIG. 1, the center 26 includes an elongated steel body 40 having two opposite end portions 42, 44 and a centering pin 46 arranged within the body 40 for movement therealong. One end portion 42, or the upper end portion as viewed in FIG. 1, of the body 40 is adapted to be secured within a collet within any of a number of collet sizes. In this connection and as shown in FIGS. 1-3, the end portion 42 is formed so as to provide a plurality of cylindrical securement sections 48, 50, 52, 54 having different diameters and which are arranged along the longitudinal axis of the body 40. The cylindrical sections 48, 50, 52, 54 are arranged so that the sections are progressively larger as a path is traced toward the opposite body end portion 44 and so that the end portion 42 is provided with a stepped appearance. In accordance with the present invention, each of the sections 48, 50, 52 or 54 is appropriately shaped to fit securely within a collet of corresponding size. In the depicted embodiment 20, section 48 possesses a diameter of 0.375 inches, section 50 possesses a diameter of 0.50 inches, section 52 possesses a diameter of 0.625 inches and section 54 possesses a diameter of 0.75 inches. Accordingly, the embodiment 20 is adapted to be received by and mounted within any collet having an opening sized to accommodate tool shanks having diameters of 0.375 inches, 0.50 inches, 0.625 inches or 0.75 inches.

The other end portion 44, or lower end portion as viewed in FIG. 1, of the body 40 extends from the cylindrical section 54 so as to define a cylindrical outer surface and terminates in a planar end 56. Furthermore, the body 40 defines a circular bore or cavity 58 extending axially along the body 40 from the end 56 thereof. The cavity 58 is of such size to accommodate the centering pin 46 positioned therein and extends for an appreciable distance through the body 40 from the end 56. With reference to FIG. 2, the body 40 further defines a slot 60 which communicates with the cavity 58 and extends for a substantial distance along the side of the body 40. For a reason apparent herein, the slot 60 includes a major section 62 which extends linearly along the body 40 and a notch 63 joined to one side of the slot section 62 adjacent the end of the section 62 positioned farthest from the body end 56. In the depicted embodiment 20, the notch 63 is somewhat L-shaped so that one leg of notch 63 extends along a path arranged in a radial plane of the body 40 and the other leg extends downwardly, as view in FIG. 1, along a path oriented generally parallel to the longitudinal axis of the body 40.

With reference to FIGS. 1, 2, 5 and 6, the centering pin 46 includes an elongated steel shank 64 comprised of a tipped end section 66 and a major section 68 journaled to the tipped section 66 to permit the tipped section 66 to be rotated relative to the major section 68. The tipped section 66 includes a conical portion which terminates in a pointed tip 70, and the major section 68 is cylindrical in its entirety. As best shown in FIG. 2, the largest diameter of the tipped section 66 is no greater than that of the major section 68 so that the tipped section 66 may move into or out of the cavity 58 with the major section 68. For purposes of journalling the tipped and major sections 66 and 68 together and as best shown in FIGS. 5 and 6, a ball bearing 72 is interposed between the sections 66 and 68. The bearing 72 is connected to the major section 68 by means of a small shaft 74 having one end fixed within the inner race of the bearing 72 and another end which is fixed within a suitable bore 76 in an end of the major section 68. The tipped section 66 defines a circular recess 78 and the outer race of the bearing 70 is snugly received by the recess 78 to maintain the outer race in a stationary relationship to the tipped section 66. It follows that as the tipped section 66 rotates relative to the major section 68, the outer bearing race rotates relative to the inner bearing race.

With reference again to FIGS. 1 and 2, the major section 68 of the centering pin shank 64 is received by the cavity 58 for longitudinal and rotational movement relative to the body 40. More specifically, the pin shank section 68 is longitudinally movable relative to the body 40 between an extended position as illustrated in solid lines in FIG. 2 and a retracted position as illustrated in phantom in FIG. 2. As shown in FIG. 2, a substantial portion of the pin shank 64 extends from the cavity 58 when in an extended position. Moreover, the pin shank section 68 is rotatably movable relative to the body 40 between one angular position and another angular position. As will be apparent herein, the permitted rotation of the shank section 68 accommodates a locking of the shank section 68 in a retracted position.

The centering pin 46 also includes a handle 80 in the form of a steel bar fixedly secured in one side of the shank section 68 so as to project through the slot 60. As is apparent herein, the handle 80 provides means by which the pin shank 64 can be manually moved between the extended and retracted positions. As the pin shank 64 is moved between the extended and retracted positions, the handle 80 is guided along the slot 60.

In accordance with the present invention, the centering pin 46 can be releasably locked in a retracted position. In this connection and as best shown in FIG. 1, the handle 80 and slot 60 cooperate to permit the handle 80 to be manipulated into a position at which movement of the pin shank 64 toward its extended position is prevented. More specifically, the handle 80 can be manipulated into the downwardly-extending, as viewed in FIG. 1, leg of the slot notch 63 so that rotational and downward movement of the pin 46 is prevented. It will be understood that the L-shape of the notch 63 requires that the handle 80 be shifted from one angular position, illustrated in phantom in FIG. 4, to another angular position, illustrated in solid lines in FIG. 4, in order to move the handle from the slot major section 62 to the downwardly-extending leg of the notch 63. The permitted rotation of the pin shank section 68 relative to the body 40 permits the handle 80 to be manipulated as aforedescribed.

The center 20 also includes biasing means 82 in the form of a compression spring 84 interposed between the centering pin 46 and the body 40 for biasing the pin 46 toward the FIG. 2 extended position. As shown in FIG. 2, the spring 84 is positioned within the cavity 58 so that its ends act against the upper end of the cavity 58 and the upper end of the shank section 68 for urging the shank section 68 out of the body 40. The cooperation between the handle 80 and the bottom of the slot 60 prevents the shank section 68 from being completely pushed out of the body 40 by the spring 84.

To utilize the center 20 and with reference again to FIG. 1, the tapping tool 24 is positioned in operative relationship with the workpiece bore 26 for a tapping operation, and the machine tool collet 22 is positioned in axial registry with the tapping tool 24. The centering pin 46 is then locked in its retracted position by appropriate manipulation of the handle 80, and the body end portion 42 is operatively mounted within the collet 22 so that the centering pin shank 64 is aligned with the tapping tool 24. The centering pin 46 is then released from its locked position and directed downwardly so that its tip 70 is accepted by the recess 36 defined in the upper end of the tapping tool 24. If necessary, the collet 22 is then lowered to a degree necessary to compress the spring 84 between the body 40 and centering pin 46 so that the spring 84 is in a condition for continually urging the pin shank 64 downwardly as the tapping tool 24 moves axially downwardly through the workpiece bore 26.

It follows from the foregoing that the center 20 stabilizes the upper end of the tapping tool 24 so that the tool 24 is maintained in axial alignment with the bore 26 and maintains its engagement with the tool 24 as the tool 24 moves downwardly through the bore 26. Therefore, the machine tool collet 24 need not be continually lowered as the tapping tool 24 moves downwardly in order that the centering pin tip 70 maintain its position within the tool recess 36.

The center 20 is advantageous for its capacity to enable an operator to lock the centering pin 46 in a retracted position. Such a capacity enables an operator to maneuver the center 20 into operative registry with the tapping tool 24 with no need that the operator simultaneously hold the centering pin 46 in a retracted position.

Another advantage relates to the stepped end portion 42 of the body 40 which enables the center 20 to be mounted within a collet possessing any size within a range of sizes. Therefore, the operator is not limited to the use of a collet of a specific size for mounting the center 20 within a machine tool. Still another advantage relates to the rotatable, or live, end section 66 of the centering pin shank 64 adapted to engage the end of the rotatable tapping tool 24. As the shank tip 70 remains in engagement with the tapping tool 24 and the tool 24 is rotated, the shank end section 66 is permitted to rotate relative to the major section 68 of the centering pin shank. Because the end section 66 is free to rotate with the tapping tool 24, the resulting wear upon the tip 70 from the tool 24 is relatively small.

It will be understood that numerous modifications and substitutions can be had to the aforedescribed embodiment without departing from the spirit of the invention. Accordingly, the aforedescribed embodiment is intended for the purpose of illustration and not as limitation.

What is claimed is:

1. A center for maintaining a cutting tool, such as a tapping tool or reamer, in axial alignment with a hole to be worked upon, said center comprising:

an elongated body having two opposite ends, one of said ends adapted to be mounted within the holding device of a machine tool positioned in registry with the hole to be worked upon, the body defining an elongated cavity opening out of the other end of said body and including a slot extending along a side of said body and in communication with said cavity;

an elongated centering pin having a tipped shank which is positioned within said elongated cavity so that the tip of said shank is directed generally out of the cavity for cooperatively engaging the cutting tool with which the center is to be used, said shank being positioned within said cavity for sliding movement longitudinally of said body between an extended position at which a substantial portion of said pin extends out of said cavity and a retracted position, said centering pin including an accessible handle joined to said shank and extending through said slot, said handle cooperating with said slot so that as said centering pin is guided along said cavity, the handle is guided along said slot;

biasing means interposed between said centering pin and said elongated body for biasing the centering pin shank from the retracted position toward the extended position; and said body slot having an elongated section extending linearly along one side of said body and parallel to the longitudinal axis thereof and an L-shaped notch joined to said elongated slot section at an end thereof opposite said other end of said body, said L-shaped notch having two leg portions forming a right angle with one another, one leg of said L-shaped notch being joined to said elongated slot section so as to form substantially a right angle therewith and the other of the notch legs being oriented substantially parallel to the elongated slot section and directed from the one notch leg generally toward said other end of said body;

said handle being slidably movable relative to said body through the elongated slot section for moving the centering pin axially through the body cavity between the extended and retracted positions, being slidably movable relative to said body through said one leg of said notch for rotating the centering pin within the body cavity between a first position at which the handle is positioned at the end of said slot section opposite said other end of said body and a second position at which the handle is offset to one side of said elongated slot section, and being slidably movable relative to said body into and out of said other leg of said notch for axially shifting the centering pin through the body cavity between said second position and a locked position at which the handle cooperates with said other leg to prevent the centering pin from rotating within the body cavity and returning to the extended position, the L-shaped notch being disposed along the length of the body so that upon manipulation of the handle from the elongated slot section and into said other of the notch legs through said one notch leg, the centering pin is releasably locked in a retracted position against the biasing force of the biasing means and prevented from returning to the elongated slot section; and said centering pin shank including an end section providing the tip of said shank and another section to which said handle is connected so that the rotation of said another section relative to said body is prevented when said handle is positioned in the elongated section of said slot or the other leg of the slot notch, and said end section is journaled to said another section so that when the tip cooperatively engages a cutting tool and the cutting tool is rotated, the end section is permitted to rotate with the cutting tool.

2. A center as defined in claim 1 wherein said one body end includes means enabling said shank to be mounted within collets of alternative sizes, said enabling means including a plurality of alternatively-sized securement sections arranged axially along said body and each securement section is adapted to be mounted within a collet of a predetermined size.

3. A center as defined in claim 2 wherein said enabling means includes at least three securement sections arranged axially along said body and wherein the securement sections are arranged along said one body end so that the securement sections increase in size as a path is traced along said body toward said other body end.

4. A center as defined in claim 1 wherein each of said end section and said another section are circular in cross section and the largest diameter of said end section is no greater than the largest diameter of said another section so that said end section is free to pass into and out of said cavity as the centering pin shank is moved longitudinally of said body.

5. A center for maintaining a cutting tool, such as a tapping tool or reamer, in axial alignment with a hole to be worked upon, said center comprising:

an elongated body having two opposite ends, one of said ends adapted to be mounted within the holding device of a machine tool positioned in registry with the hole to be worked upon, the body defining an elongated cavity opening out of the other end of said body and including a slot extending along a side of said body and in communication with said cavity;

an elongated centering pin having a tipped shank which is positioned within said elongated cavity so that the tip of said shank is directed generally out of the cavity for cooperatively engaging the cutting tool with which the center is to be used, said shank being positioned within said cavity for sliding movement longitudinally of said body between an extended position at which a substantial portion of said pin extends out of said cavity and a retracted position, said centering pin including an accessible handle joined to said shank and extending through said slot, said handle cooperating with said slot so that as said centering pin is guided along said cavity between the extended and retracted positions, the handle is guided along said slot;

biasing means interposed between said centering pin and said elongated body for biasing the centering pin shank from the retracted position toward the extended position;

said body slot having an elongated section extending linearly along one side of said body and parallel to the longitudinal axis thereof and an L-shaped notch joined to said elongated slot section at an end thereof opposite said other end of said body, said L-shaped notch having two leg portions forming a right angle with one another, one leg of said L-shaped notch being joined to said elongated slot section so as to form substantially a right angle therewith and the other of the notch legs being oriented substantially parallel to the elongated slot section and directed from the one notch leg generally toward said other end of said body, said handle being slidably movable relative to said body through the elongated slot section for moving the centering pin axially through the body cavity between the extended and retracted positions, being slidably movable relative to said body through said one leg of said notch for rotating the centering pin within the body cavity between a first position at which the handle is positioned at the end of said slot section opposite the other end of said body and a second position at which the handle is offset to one side of said elongated slot section, and being slidably movable relative to said body into and out of said other leg of said notch for axially shifting the centering pin through the body cavity between said second position and a locked position at which the handle cooperates with said other leg to prevent the centering pin from rotating within the body cavity and returning to the extended position, the L-shaped notch being disposed along the length of the body so that upon manipulation of the handle from the elongated slot and into said other of the notch legs through said one notch leg, the centering pin is releasably locked in a retracted position against the biasing force of the biasing means and prevented from returning to the elongated slot section, said centering pin shank including an end section providing the tip of said shank and another section to which said handle is attached so that the rotation of said another section relative to said body is prevented when said handle is positioned in the elongated section of said slot or the other leg of the slot notch, and said end section is journaled to said another section so that when the tip cooperatively engages a cutting tool and the cutting tool is rotated, the shank end section is permitted to rotate with the cutting tool about the longitudinal axis of said shank, and said one body end includes means enabling said shank to be mounted within collets of alternative sizes, said enabling means including a plurality of alternatively-sized securement sections arranged axially along said body and each securement section is adapted to be mounted within a collet of a predetermined size.

6. A center as defined in claim 5 wherein said each of said end section and said another section are circular in cross section and the largest diameter of said end section is no greater than the largest diameter of said another section so that said end section is free to pass into and out of said cavity as the centering pin shank is moved longitudinally of said body.

7. A center as defined in claim 5 wherein said centering pin includes a bearing interposed between said end section and said another section of said centering pin shank so that said end section is rotatable relative to said another section.

* * * * *